United States Patent
Kliger

(10) Patent No.: US 11,409,865 B1
(45) Date of Patent: Aug. 9, 2022

(54) VERIFICATION CODE INJECTION AT BUILD TIME

(71) Applicant: CyberArk Software Ltd, Petach-Tikva (IL)

(72) Inventor: Amit Kliger, Petach-Tikva (IL)

(73) Assignee: CyberArk Software Ltd., Petach-Tikva (IL)

(*) Notice: Subject to any disclaimer, the term of this patent is extended or adjusted under 35 U.S.C. 154(b) by 0 days.

(21) Appl. No.: 17/403,569

(22) Filed: Aug. 16, 2021

(51) Int. Cl.
- H04L 29/06 (2006.01)
- G06F 21/54 (2013.01)
- H04L 9/06 (2006.01)
- H04L 9/32 (2006.01)
- G06F 21/64 (2013.01)

(52) U.S. Cl.
CPC ............. *G06F 21/54* (2013.01); *G06F 21/64* (2013.01); *H04L 9/0643* (2013.01); *H04L 9/3247* (2013.01)

(58) Field of Classification Search
CPC ....... G06F 21/54; G06F 21/64; H04L 9/0643; H04L 9/3247
See application file for complete search history.

(56) References Cited

U.S. PATENT DOCUMENTS

| | | | |
|---|---|---|---|
| 7,080,249 B1 * | 7/2006 | Jakubowski | G06F 21/125 713/165 |
| 7,500,109 B2 * | 3/2009 | Nusser | G06Q 20/3672 713/187 |
| 10,298,396 B1 * | 5/2019 | Kurani | H04L 63/0861 |
| 10,951,404 B1 * | 3/2021 | Kuang | H04L 9/3093 |
| 2002/0138441 A1 * | 9/2002 | Lopatic | G06F 21/125 705/59 |
| 2006/0107320 A1 * | 5/2006 | Bhatt | G06F 21/575 726/22 |
| 2014/0188638 A1 * | 7/2014 | Jones | G06Q 20/206 705/16 |
| 2015/0270969 A1 * | 9/2015 | Ishizaka | H04L 63/0815 713/185 |
| 2015/0312041 A1 * | 10/2015 | Choi | G06F 21/33 713/175 |
| 2017/0310653 A1 * | 10/2017 | Zhang | H04L 63/08 |
| 2018/0165428 A1 * | 6/2018 | Miller | G06F 21/12 |
| 2018/0329630 A1 * | 11/2018 | Zhou | G06F 3/0619 |
| 2019/0114429 A1 * | 4/2019 | Shimizu | G06F 21/575 |
| 2019/0325673 A1 * | 10/2019 | Bardack | G07C 9/21 |

* cited by examiner

*Primary Examiner* — Ghodrat Jamshidi
(74) *Attorney, Agent, or Firm* — Finnegan, Henderson, Farabow, Garrett & Dunner

(57) ABSTRACT

Disclosed embodiments relate to systems and methods for injecting verification code into source code files. Techniques include accessing a plurality of elements of source code from a source, identifying a plurality of sequentially ordered executable modules from the plurality of element and generating verification code. The techniques may further include configuring the verification code to verify the integrity of at least one of a plurality of neighboring executable modules and may also include injecting the verification code into one or more of the source code files.

20 Claims, 6 Drawing Sheets

VERIFICATION CODE INJECTION AT BUILD TIME

BACKGROUND

In the field of cyber security, many software applications are vulnerable to a cyber attack through inadvertent or malicious attacks on the software source code and executables. These cyber attacks can lead to data or other security breaches for a company or user, resulting in the exposure of secure or confidential data, loss of functionality of critical software systems, and other damages.

Many security systems exist to mitigate against such cyber attacks. Several security systems use a centralized system to detect and mitigate against a cyber security threat. Such centralized systems may include an anti-virus program, use of a certificate store associated with the operating system, or other centralized methods. Such centralized methods are vulnerable to malicious attack because they operate as a single point of failure in the cyber security detection system. Once the sole centralized security feature is compromised, the remaining software is also comprised. Other security methods such as the use of public key infrastructure (PKI) are vulnerable to malicious attack because private keys can be compromised or stolen, and because any certificate authority can sign a certificate for any person or computer and this certificate authority may not be suitable for a particular user's security needs.

Accordingly, in view of these and other deficiencies in existing security techniques, technological solutions are needed for improving software security by injecting verification code into source code files. Solutions should automate the generation and implementation of the verification code and allow for a seamless verification and security process without requiring action or intervention by the user. Solutions should also create redundancy in the detection process by invoking verification of source code files across multiple executable modules that are capable of verifying additional executable modules in the source code files. Solutions should also improve use of public and private keys by implementing short-term ephemeral key pairs.

SUMMARY

The disclosed embodiments describe non-transitory computer readable media, systems, and methods for injecting verification code into source code files. For example, in an embodiment, a non-transitory compute readable medium may include instructions that, when executed by at least one processor, cause the at least on processor to perform operations for injecting verification code into source code files. The operations may comprise accessing a plurality of elements of source code from a source; identifying a plurality of sequentially ordered executable modules from the plurality of elements; generating verification code, wherein the verification code is configured to verify the integrity of at least one of a plurality of neighboring executable modules; and injecting the verification code into one or more of the source code files.

According to a disclosed embodiment, generating the verification code may include determining an integrity value for at least one of the executable modules.

According to a disclosed embodiment, the integrity value may be based on the cryptographic hash values for at least one of the executable modules in the sequence and injecting the verification code may include injecting one or more of the source code files with the verification code for at least one of the executable modules in the sequence.

According to a disclosed embodiment, the integrity value may be determined based on a digital signature.

According to a disclosed embodiment, generating the verification code may include generating an ephemeral key pair comprising a public component and a private component.

According to a disclosed embodiment, injecting the verification code may include inserting the public component into one or more of the source code files and the operations may further comprise signing at least one executable module with the private component.

According to a disclosed embodiment, the ephemeral key pair may be unique to the plurality of sequentially ordered executable modules.

According to a disclosed embodiment, the private component of the ephemeral key pair may be discarded.

According to a disclosed embodiment, the verification code may verify a subset of the executable modules.

According to a disclosed embodiment, the source may contain integrity violation response code configured to perform a security action based on the verification code.

According to a disclosed embodiment, the sequence of the sequentially ordered executable modules may be determined by an order of operations for building the executable modules.

According to a disclosed embodiment, generating the verification code may further comprise determining an integrity value based on a cryptographic hash value for one of the executable modules and generating an ephemeral key pair comprising a public component and a private component.

According to a disclosed embodiment, the verification code may be configured to verify the integrity of a predetermined quantity of the executable modules.

According to a disclosed embodiment, the integrity value may be based on the cryptographic hash values for at least one of the executable modules in the sequence and injecting the verification code may include injecting the verification code for at least one of the preceding modules in the sequence.

According to another disclosed embodiment, there may be a computer-implemented method for injecting verification code at build time. The method may comprise accessing a plurality of elements of source code from a source; identifying a plurality of sequentially ordered executable modules from the plurality of elements; generating verification code, wherein the verification code is configured to verify the integrity of at least one of a plurality of neighboring executable modules; and injecting the verification code into one or more of the source code files.

According to a disclosed embodiment, the generating of the verification code may further comprise determining an integrity value for one at least one of the executable modules and generating an ephemeral key pair comprising a public component and a private component.

According to a disclosed embodiment, the source may contain an integrity violation response module that may be configured to perform a security action based on the verification code.

According to a disclosed embodiment, the operations may further comprise detecting an integrity violation based on the verification code and performing a security action.

According to a disclosed embodiment, generating the verification code may include generating a new executable module configured to verify the integrity of at least one of the plurality of neighboring executable modules.

Aspects of the disclosed embodiments may include tangible computer readable media that store software instructions that, when executed by one or more processors, are configured for and capable of performing and executing one or more of the methods, operations, and the like consistent with the disclosed embodiments. Also, aspects of the disclosed embodiments may be performed by one or more processors that are configured as special-purpose processor(s) based on software instructions that are programmed with logic and instructions that perform, when executed, one or more operations consistent with the disclosed embodiments.

It is to be understood that both the foregoing general description and the following detailed description are exemplary and explanatory only and are not restrictive of the disclosed embodiments.

BRIEF DESCRIPTION OF THE DRAWINGS

The accompanying drawings, which are incorporated in and constitute a part of this specification, illustrate disclosed embodiments and, together with the description, explain the disclosed embodiments.

DETAILED DESCRIPTION

Figure 1:
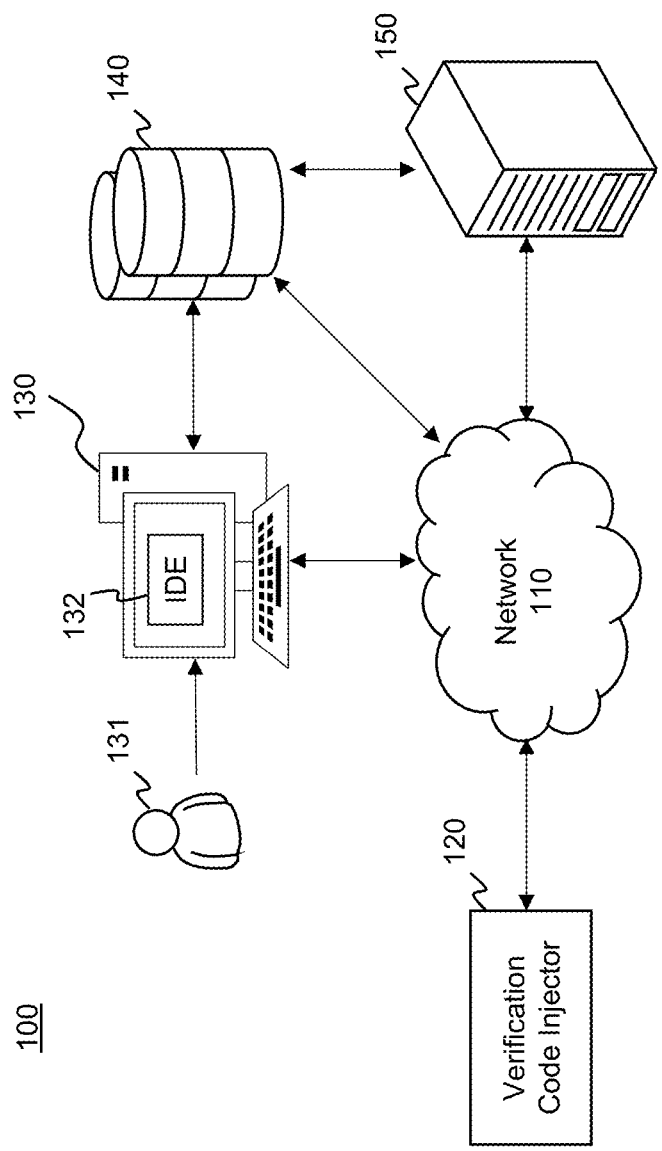
FIG. 1 is a block diagram of an exemplary system for injecting verification code into source code files.

In the following detailed description, numerous specific details are set forth to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are not constrained to a particular order or sequence or constrained to a particular system configuration. Additionally, some of the described embodiments or elements thereof can occur or be performed simultaneously, at the same point in time, or concurrently.

The verification code generation and injection techniques, as described herein, overcome several technological problems related to the security and management of computing systems. For example, a software developer may not desire to take the time to write custom verification code for each software module. Furthermore, developers, users, and organizations may desire to provide more secure verification techniques that implement detection and verification techniques performed by multiple executable modules to create redundancy in detection and improve security. For example, traditional approaches utilizing an anti-virus system, the operating system, a certificate store, or a centralized whitelisting technology like AppLocker™ are vulnerable to attack because they represent a single point of failure in the code verification system. A malicious actor can compromise the single point of failure and expose the remaining source code to cyber-attack.

As described below, the disclosed embodiments provide solutions to these and other problems in the field. For example, disclosed techniques improve security by automatically generating and injecting verification code into the software application at build time. Such techniques save time and effort for a software developer who no longer needs to implement custom detection techniques and reduces the risk of errors in coding through manual processes. These techniques improve security and reliability over existing cyber security solutions. Automatic generation and implementation of the verification code allows for a seamless verification and security process without requiring action or intervention by the user. Furthermore, disclosed techniques include injecting verification code into a plurality of sources code files at build time, which creates redundancy in the detection process due to invocation of the verification code at runtime via a multitude of executable modules created from the source code files, which allows the executable modules to verify adjacent executable modules at runtime. The generation of verification code may be based on an integrity value for the executable module, such as a cryptographic hash value produced by a hash algorithm. Disclosed embodiments may employ techniques for sequential executable modules to verify previous modules in the sequence based on the integrity value, which is unique to the current build and is unlikely to be compromised by outside attack. These techniques improve cybersecurity because each consecutive module in the sequence of executable modules is capable of verifying the preceding module in the sequence because it may verify the integrity values for all preceding modules in the sequence.

Disclosed embodiments may also improve security by using short-term ephemeral key pairs. In some embodiments, a public and private cryptographic key pair is generated, where the public key is injected into the source code files. At build time, executable modules containing the public component are generated from the elements of source code, and the executable modules are then signed or authenticated by the private key component. The private key may then be discarded, which removes the ability for the private key to be compromised or duplicated by malicious actors or through inadvertent actions. Unlike generating verification code based on an integrity value, the ephemeral key pairs may be used to verify the integrity of a single module or of subsequent modules in the sequence of sequentially ordered modules. This improves security at least by providing for verification of the final module in the sequence. Furthermore, disclosed embodiments may employ various combinations of the disclosed verification techniques, including generating and injecting verification code based on a combination of a determined integrity value and an ephemeral key pair. Such a combination improves security by implementing verification techniques across multiple modules in the sequence of sequentially ordered executable modules, while also ensuring each module in the sequence is verified.

Reference will now be made in detail to the disclosed embodiments, examples of which are illustrated in the accompanying drawings.

FIG. 1 illustrates an exemplary system 100 for injecting verification code into source code files, consistent with the disclosed embodiments. System 100 may represent an environment in which software code is developed and/or executed, for example in a DevOps (e.g., continuous development or continuous deployment) environment, local (e.g., LAN) development environment, remote (e.g., GitHub™) environment, cloud (e.g., AWS™, Azure™, IBM Cloud™, etc.) environment, or the like. System 100 may include one or more verification code injectors 120, one or more computing devices 130, one or more databases 140, and one or more servers 150, as shown in FIG. 1.

The various components of system 100 may communicate over a network 110. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth, infrared, etc.), or various other types of network communications. In some embodiments, the communications may take place across two or more of these forms of networks and protocols. While system 100 is shown as a network-based environment, it is understood that the disclosed systems and methods may also be used in a localized system, with one or more of the components communicating directly with each other.

Computing devices 130 may be a variety of different types of computing devices capable of developing, storing, analyzing, building, and/or executing software code. For example, computing device 130 may be a personal computer (e.g., a desktop or laptop), an IoT device (e.g., sensor, smart home appliance, connected vehicle, etc.), a server, a mainframe, a vehicle-based or aircraft-based computer, a virtual machine (e.g., virtualized computer, container instance, etc.), or the like. Computing device 130 may be a handheld device (e.g., a mobile phone, a tablet, or a notebook), a wearable device (e.g., a smart watch, smart jewelry, an implantable device, a fitness tracker, smart clothing, a head-mounted display, etc.), an IoT device (e.g., smart home devices, industrial devices, etc.), or various other devices capable of processing and/or receiving data. Computing device 130 may operate using a Windows™ operating system, a terminal-based (e.g., Unix or Linux) operating system, a cloud-based operating system (e.g., through AWS™, Azure™, IBM Cloud™, etc.), or other types of non-terminal operating systems. As discussed further below, computing devices 130 may be used for developing and/or running software code, functions, or scripts. For example, a user 131 may develop software code through an Integrated Development Environment (IDE) 132 operated on computing device 130.

System 100 may further comprise one or more database(s) 140, for storing and/or executing software. For example, database 140 may be configured to store software or code, such as code developed using computing device 130. Database 140 may further be accessed by computing device 130, server 150, or other components of system 100 for downloading, receiving, processing, editing, or running the stored software or code. Database 140 may be any suitable combination of data storage devices, which may optionally include any type or combination of slave databases, load balancers, dummy servers, firewalls, back-up databases, and/or any other desired database components. In some embodiments, database 140 may be employed as a cloud service, such as a Software as a Service (SaaS) system, a Platform as a Service (PaaS), or Infrastructure as a Service (IaaS) system. For example, database 140 may be based on infrastructure of services of Amazon Web Services™ (AWS), Microsoft Azure™, Google Cloud Platform™, Cisco Metapod™ Joyent™, vmWare™, or other cloud computing providers. Data sharing platform 140 may include other commercial file sharing services, such as Dropbox™, Google Docs™, or iCloud™. In some embodiments, data sharing platform 140 may be a remote storage location, such as a network drive or server in communication with network 110. In other embodiments database 140 may also be a local storage device, such as local memory of one or more computing devices (e.g., computing device 130) in a distributed computing environment.

System 100 may also comprise one or more server device(s) 150 in communication with network 110. Server device 150 may manage the various components in system 100. In some embodiments, server device 150 may be configured to process and manage requests between computing devices 130 and/or databases 140. In embodiments where software code is developed within system 100, server device 150 may manage various stages of the development process, for example, by managing communications between computing devices 130 and databases 140 over network 110. Server device 150 may identify updates to code in database 140, may receive updates when new or revised code is entered in database 140, and may participate in performing the verification code injection techniques discussed below in FIGS. 3-6.

Verification code injector 120 may be any device, component, program, script, or the like, for generating and injecting verification code into source code files within system 100, as described in more detail below. Verification code injector 120 may be configured to monitor other components within system 100, including computing device 130, Integrated Development Environment 132, database 140, and server 150. In some embodiments, verification code injector 120 may be implemented as a separate component within system 100, capable of analyzing software and computer codes or scripts within network 110. In other embodiments, verification code injector 120 may be a program or script and may be executed by another component of system 100 (e.g., integrated into computing device 130, database 140, or server 150).

Figure 2:
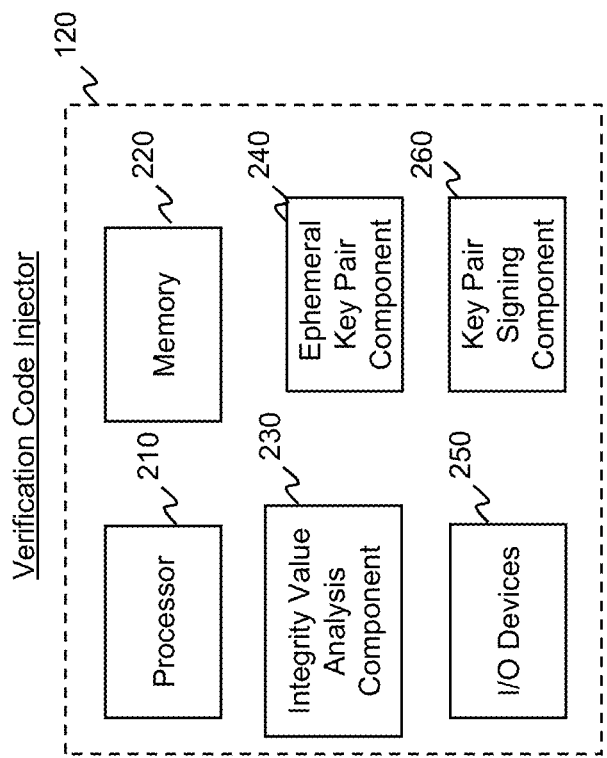
FIG. 2 is a block diagram showing an exemplary verification code injector in accordance with disclosed embodiments.

Verification code injector 120 may comprise additional elements to facilitate analysis of software, code, functions, and/or scripts within system 100. FIG. 2 is a block diagram showing an exemplary verification code injector 120 in accordance with disclosed embodiments. For example, verification code injector 120 may be a computing device and may include one or more dedicated processors 210 and/or memories 220. Processor (or processors) 210 may include one or more data or software processing devices. For example, the processor 210 may take the form of, but is not limited to, a microprocessor, embedded processor, or the like, or may be integrated in a system on a chip (SoC). Furthermore, according to some embodiments, the processor 210 may be from the family of processors manufactured by Intel®, AMO®, Qualcomm®, Apple®, NVIDIA®, or the like. The processor 210 may also be based on the ARM architecture, a mobile processor, or a graphics processing unit, etc. In some embodiments, verification code injector 120 may be employed as a cloud service, such as a Software as a Service (SaaS) system, a Platform as a Service (PaaS), or Infrastructure as a Service (IaaS) system. For example, verification code injector 120 may be based on infrastructure of services of Amazon Web Services™ (AWS), Microsoft Azure™, Google Cloud Platform™, Cisco Metapod™, Joyent™, vmWare™, or other cloud computing providers. The disclosed embodiments are not limited to any type of processor configured in the computing device 130.

Memory (or memories) 220 may include one or more storage devices configured to store instructions or data used by the processor 210 to perform functions related to the disclosed embodiments. Memory 220 may be configured to store software instructions, such as programs, that perform one or more operations when executed by the processor 210 to generate and inject verification code into source code files, for example, using methods 500 and 600, described in detail below. The disclosed embodiments are not limited to software programs or devices configured to perform dedicated tasks. For example, the memory 220 may store a single program, such as a user-level application, that performs the functions of the disclosed embodiments, or may comprise multiple software programs. Additionally, the processor 210 may in some embodiments execute one or more programs (or portions thereof) remotely located from the computing device 130. Furthermore, the memory 220 may include one or more storage devices configured to store data (e.g., machine learning data, training data, algorithms, etc.) for use by the programs, as discussed further below.

Verification code injector 120 may further comprise one or more components for performing various operations of the disclosed embodiments. For example, verification code injector 120 may contain an integrity value analysis component 230 and an ephemeral key pair component 240. Integrity value analysis component 230 and ephemeral key pair component 240 may be configured to access or receive code or code segments from other components or devices within system 100. For example, integrity value analysis component 230 may be configured to access and inspect computing device 130, database 140, or server 150 for the presence of source code files, to generate verification code based on sequentially ordered executable modules compiled from the source code files, and to inject verification code into the source code files as described further below. Ephemeral key pair component 240 may be configured to access and inspect computing device 130, database 140, or server 150 for the presence of source code files and to generate an ephemeral key pair comprising a public and private component, insert the public component into one of the source code files, inject verification code into the source code that verifies the digital signature of one or more of the executable modules via the public component, and to sign the sequentially ordered executable modules with the private component. Verification code injector 120 may also include key pair signing component 260. Key pair signing component 260 may be configured to inspect executable modules after they are compiled and to sign the executable modules with the private component.

Integrity value analysis component 230, ephemeral key pair component 240, and key pair signing component 260 may be separate components of verification code injector 120, for example, with dedicated processors and/or memories. In other embodiments, though shown separately in FIG. 2, integrity value analysis component 230, ephemeral key pair component 240, and key pair signing component 260 may be integrated into memory 220 and/or processor 210. For example, integrity value analysis component 230, ephemeral key pair component 240, and/or key pair signing component 260 may be software code, a script, or an application stored on memory 220 and/or executed by processor 210. Further, while verification code injector 120 is shown as having dedicated processor 210 and memory 220, verification code injector 120 itself may be integrated into various other components in system 100. For example, processor 210 and/or memory 220 may be the processor and memory devices of another component in system 100, for example on server 150, database 140, or computing device 130. In such embodiments, verification code injector 120 may be executed as software code, a script, or an application.

Verification code injector 120 may further include one or more input/output (I/O) devices 250. I/O devices 250 may include one or more network adaptors or communication devices and/or interfaces (e.g., WiFi, Bluetooth®, RFID, NFC, RF, infrared, Ethernet, etc.) to communicate with other machines and devices, such as with other components of system 100 through network 110. For example, verification code injector 120 may use a network adaptor to scan for code and code segments within system 100. In some embodiments, the I/O devices 250 may also comprise a touchscreen configured to allow a user to interact with verification code injector 120 and/or an associated computing device. The I/O devices 250 may comprise a keyboard, mouse, trackball, touch pad, stylus, and the like. Like processor 210 and memory 220, in embodiments where verification code injector 120 is executed as software or code, I/O devices 250 may be associated with another component of system 100.

Aspects of this disclosure may include injecting verification code into source code files. For example, verification code may be seamlessly generated and injected into source code files without requiring manual intervention by a programmer or developer. The verification code may verify certain compiled modules of code via various methods as disclosed herein. The verification code may be configured to detect security violations and invoke custom violation handling of a security code module if an integrity violation occurs. Verification code may be written in and interface with code written in any other computer programming language and may be suitable for interfacing with compiled or uncompiled computer code. In one embodiment, the verification code may compute an integrity value of one or more adjacent executable modules and then may verify the value by comparing it with a predetermined expected value. In other embodiments, the verification code may verify integrity of compiled modules by implementing a signature scheme based on an ephemeral key pair, where a digital signature is verified via the public key. The verification code may, based on the result of said verification, select whether to transfer control to the regular program flow if no violation is detected, or, in case an integrity violation is detected (such as a mismatch between the computed hash and the expected hash) may transfer control to the custom violation handling code mentioned herein.

Figure 5:
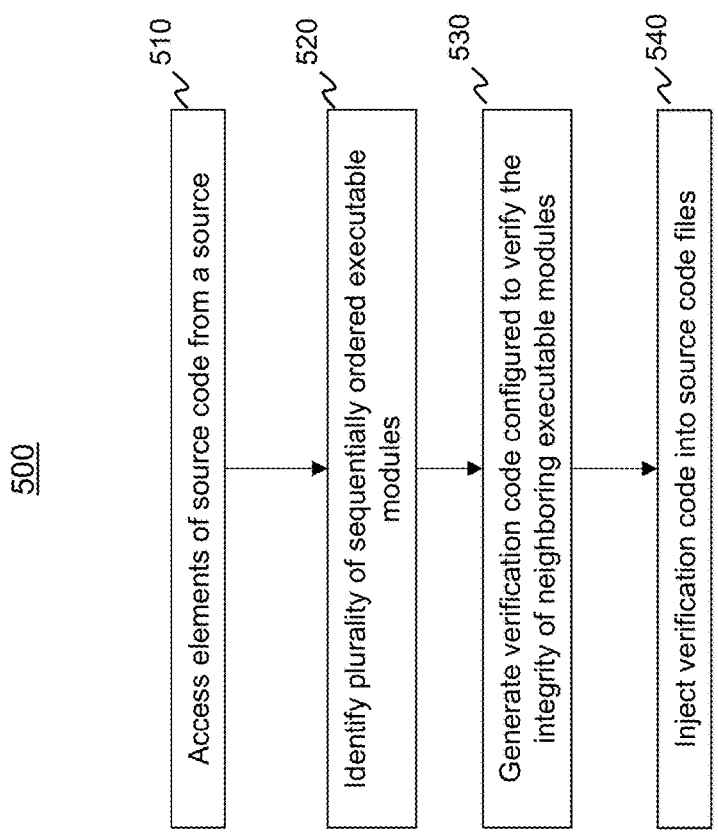
FIG. 5 is a flowchart depicting an exemplary process for injecting verification code into source code files.

FIG. 5. is a block diagram depicting an exemplary process 500 for generating and injecting verification code at build time. Process 500 may be performed, for example, by verification code injector 120.

At step 510, process 500 may include accessing one or a plurality of elements of source code. An element of source code may be any form of computer-based code, including software, mobile applications, scripts, web applications, "instant" apps, server-side applications, APIs, embedded code (e.g., in an IoT device, Raspberry Pi, Arduino, etc.), serverless code instances, or any other form of code. Source code may also be written in any suitable programming language, including but not limited to Java, Python, C, Ruby, JavaScript, C#, .NET, PHP, Objective-C, SQL, Go, C++, or various other programming languages. An element of source code may also implement one or more API actions, for example, based on AWS™ (e.g., Amazon S3™, Amazon EC2™ Amazon Elastic Beanstalk™, AWS PowerShell™, etc.), Google™ (e.g., Google APIs™, Google Analytics™, Youtube™, Ad Exchange™, Google Maps,™ etc.), social media (Twitter™, Facebook™, Linkedin™, Pinterest™, Tumblr™, Instagram™, etc.), or various other APIs. An element of source code may contain functions which, when executed, cause actions to be performed on applications and/or data within the environment in which it is installed. For example, an element of source code may be installed on one or more devices within system 100 (such as computing device 130, database 140, and/or server 150) and may cause various actions to be performed within system 110. An element of source code may call actions for performing actions on other code segments and on the external environment, which may include accessing, modifying, downloading, moving, deleting, or otherwise manipulating target data, files, applications, code segments, or other target resources in system 100.

In some embodiments, elements of source code may be from a source, for example, a repository for source code data, such as GitHub™, GitLab™, Bitbucket™, or other source control management vendors. In other embodiments, an element of source code may be accessed within system 100, such as from database 140, and/or server 150 or any other internal repository. In further embodiments, an element of source code may be accessed through a user device, such as an external hard drive, USB memory device, or any other data storage device. An element of source code is not limited to computer-based code alone but may also include external files associated with the source code, such as configuration files, operating system files, read-me files, JSON files, XML files, external text files, or any other form of external file.

In other embodiments, verification code may be used to verify the integrity of resources, objects, or elements other than executable modules. For example, the techniques disclosed herein may be applicable to other software applications including verifying the integrity of scripts, video files, or image files embedded in a website or stored locally within a database such as database 140. In yet other embodiments, verification code may verify the integrity of word processing files, PDF files, spreadsheet files, presentation files, video files, graphics files, image files, or any other file. Injecting verification code is not limited to verifying source code files or similar applications and should be understood to include verification of any software files, operating system files, program files, system files, multimedia files, or other objects in the operating system.

At step 520, process 500 may include identifying a plurality of sequentially ordered executable modules derived or compiled from the plurality of elements of source code. For example, some executable modules may already have been compiled from elements of source code into a sequence, or they may have been compiled from a different source. In other examples, a sequence of sequentially ordered executable modules expected to be compiled may be determined upon inspection of the elements of source code. In some embodiments, the identifying in step 520 may include compiling elements of source code into an executable module through use of a compiler. For example, elements of source code may be processed through a machine code compiler and transformed from a high-level source code language into a lower-level language, such as assembly language, object code, or machine code, to create an executable module. In other embodiments, one or more executable modules may already have been compiled from source code, and the executable modules are identified or marked for verification. Elements of source code may be identified or grouped into one or multiple executable modules at different points in time. In some embodiments, the plurality of executable modules may correspond to different development iterations, or versions, of a comprehensive computer program. In other embodiments, the plurality of executable modules corresponds to executable subcomponents, or processes, of a single program or a single operating system. In yet other embodiments, the plurality of executable modules corresponds to multiple independent software applications. The executable modules are not limited to executable files, but could include any compilation of machine-readable code, such as DLL files or UNIX files, or the like.

In some embodiments, the plurality of executable modules may be ordered into a sequence. For example, the sequence of the executable modules may be determined by an order of operations, a control flow sequence, or similar method for executing the executable modules to allow an overall program or operating system to perform as desired. In other embodiments, the sequence of executable modules may be determined by date of compilation, a date associated with the element of source code, or a version history or number. In other embodiments, the sequence of the plurality of executable modules may be determined by a user, such as user 131, and may be manually entered into the verification code injector 120 through I/O device 250.

Figure 3:
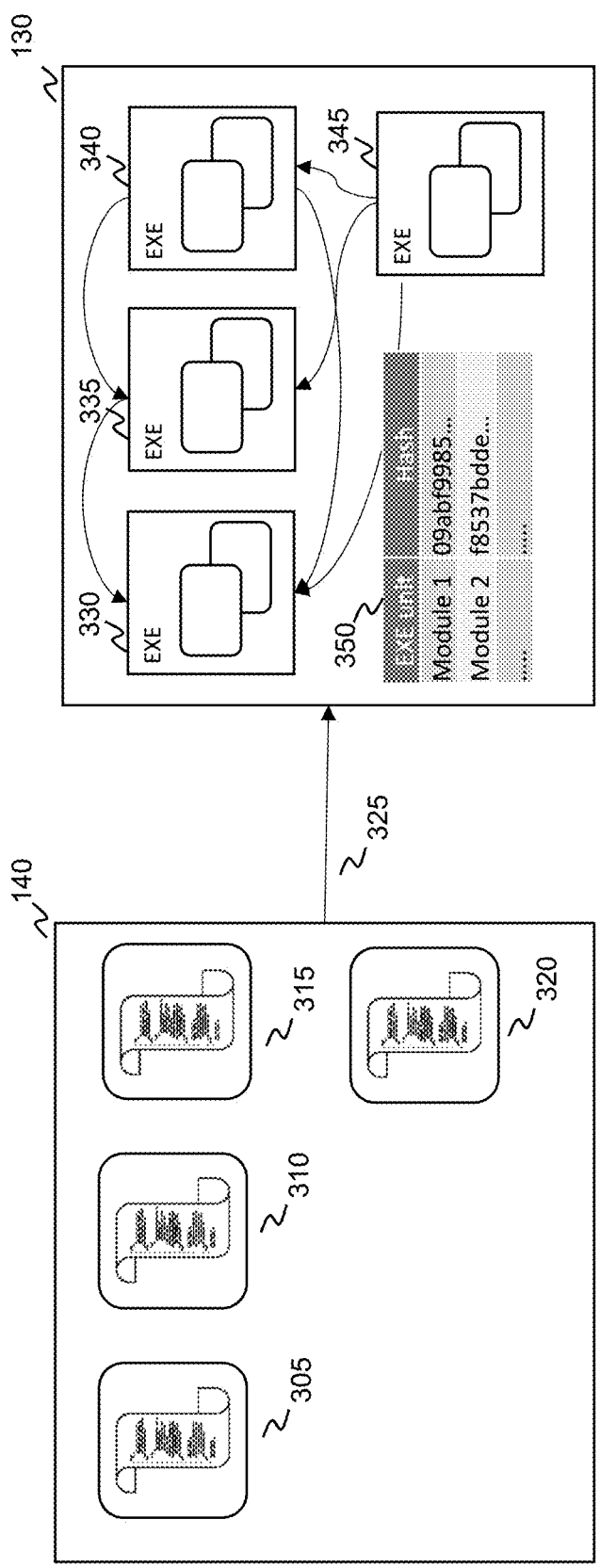
FIG. 3 is a schematic process for generating verification code based on an integrity value for the executable modules.

At step 530, process 500 may include generating verification code. Verification code may be any computer code or machine-readable code configured to verify the integrity of an executable module. In some embodiments, generating verification code may include generating verification code based on an integrity value of an executable module as depicted in FIG. 3 and described herein. In other embodiments, generating verification code may include generating verification code based on an ephemeral key pair as disclosed in FIG. 4 and described herein. In yet other embodiments, generating verification code may include generating verification code based on a combination of an integrity value of an executable module and an ephemeral key pair as shown in FIG. 5.

FIG. 3 illustrates a schematic process for generating and injecting verification code based on an integrity value for an executable module. Consistent with the discussion of process 500, the operations of FIG. 3 may be performed in connection with steps 530 and 540 of process 500. For example, database 140 may include various files representing pre-compiled elements of source code (for example, 305, 310, 315, and 320). Source code files are not limited to residing in database 140 and may instead or additionally be stored on computing device 130 or server 150 or any other user device. The pre-compiled elements of source code may be compiled through a compiler program 325 into multiple executable modules (for example, executable modules 330, 335, 340, and 345) and stored on computing device 130. The executable modules may also be stored on various other components of system 100, including database 140 and server 150. As each executable module is compiled, an integrity value 350 may be determined for each module by integrity value analysis component 230. As described herein, the integrity value may be based on any verifiable element of the executable module and may include, for example, a computed hash value of the compiled module generated by a hash algorithm. The integrity value 350 for a module may be injected into source code by verification code injector 120 that generates a subsequent module in the sequence capable of verifying one or more of the preceding modules in the sequence. For example, the integrity value 350 for module 330 may be injected into source code that becomes compiled into module 335, allowing module 335 to verify the integrity of module 330. The integrity value 350 for module 330 and module 335 may be injected into source code that is compiled into module 340, allowing module 340 to verify the integrity of both modules 330 and 335. In this way, each subsequent module in the sequence of executable modules can verify the integrity of each preceding module in the sequence.

In some embodiments, generating the verification code may include determining an integrity value for one or more executable modules. In integrity value may be any identifying feature of an executable module that is unique to the executable module. In some embodiments, the integrity value may be based on a computed cryptographic hash value of an executable module. For example, a cryptographic hash algorithm may compute a unique bit array, known as the hash value, that is unique to the executable module. The hash value may be computed with a cryptographic hash algorithm such as MD5, SHA-1, RIPEMD-160, Whirlpool, SHA-2, SHA-3, BLAKE 2, BLAKE3, or any other hash algorithm. In other embodiments, the integrity value may be based on the cryptographic hash values for a plurality of executable modules, and may include for example, the cryptographic hash values for one or more of the executable modules in the sequence as depicted in FIG. 3.

In other embodiments, the integrity value is determined based on a digital signature. For example, public key infrastructure (PKI) policies, digital certificates, and public/private key encryption techniques may be used to determine an integrity value based on a digital signature embedded into the executable module at build time. The integrity value is not limited to cryptographic hash values or digital signatures and may include any unique identifier to an executable module that can be measured and verified.

In some embodiments, generating the verification code may include generating an ephemeral key pair comprising a public component and a private component. For example, a cryptographic key pair may be generated that is unique to the current software build developed by user 131. The cryptographic key pair may include a public key component and a private key component. The cryptographic key pair may be ephemeral in the sense that the private component of the key pair may be discarded after completion of injection of the verification code as described herein. Generating the ephemeral key pair may be performed in accordance with the schematic process set out in FIG. 4.

Figure 4:
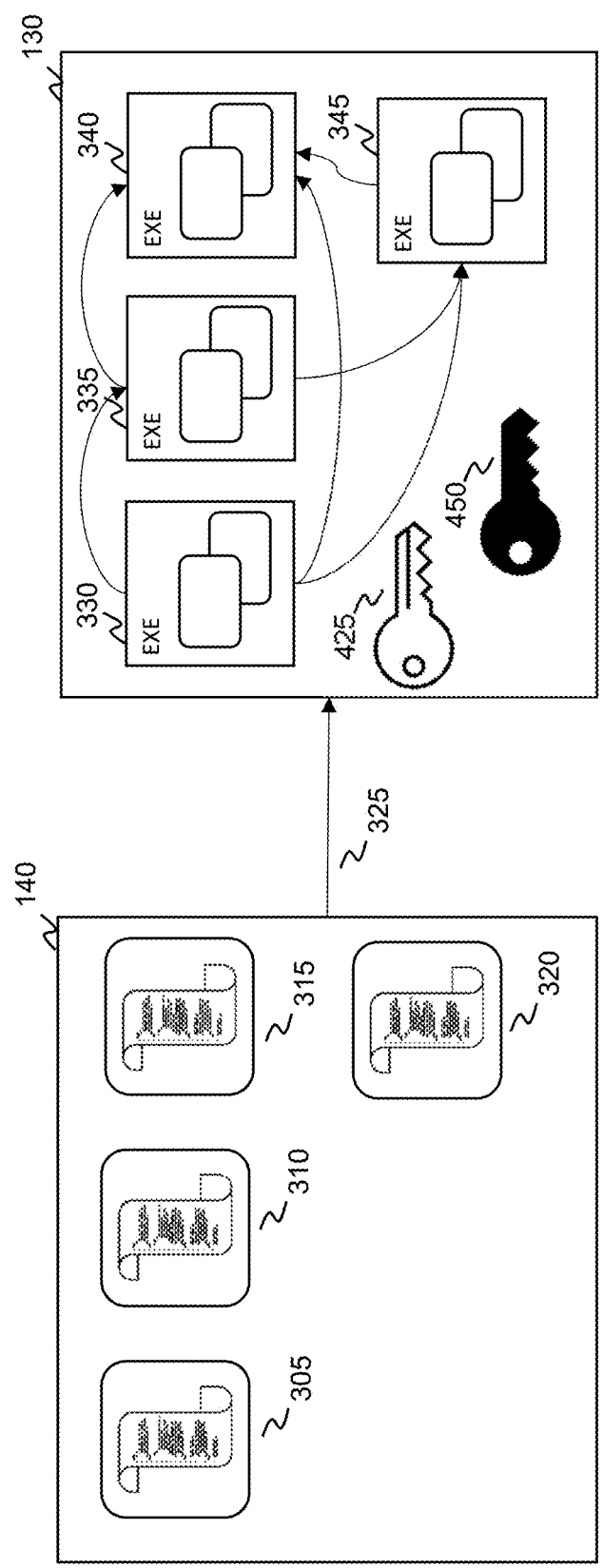
FIG. 4 is a schematic process for generating verification code based on an ephemeral key pair.

FIG. 4 is a schematic process for generating verification code based on an ephemeral key pair. For example, database 140 may include various files representing pre-compiled elements of source code (for example, 305, 310, 315, and 320). Source code files are not limited to residing in database 140 and may be stored alternatively on computing device 130 or server 150. The pre-compiled elements of source code may be compiled through a compiler program 325 into multiple executable modules (for example, executable module 330, 335, 340, and 345) and stored on computing device 130. The executable modules may also be stored on various other components of system 100, including database 140 and server 150. As each executable module is compiled, an ephemeral key pair unique to the current build consisting of a public component 425 and a private component 450 may be generated by ephemeral key pair component 240. Verification code is generated that is configured to inject the public component 425 into source code files 305, 310, 315 or 320 and to inject code that performs digital signature verification of one or more of the executable modules via the public key component 425. Injecting the public component 425 does not require that all executable modules in the current build be built and may include, for example, injecting the public component 425 into a single source code, such as pre-compiled element of source code 305. Injection may be performed by verification code injector 120. After a module is compiled into an executable unit, key pair signing component 260 may be configured to sign the executable module, for example executable module 330, with the private component 450. Injecting the public component 425, compiling the pre-compiled element of source into an executable module, and signing the module with the private component 450 may repeat with each source code file, such as for sources 305, 310, 315 and 320 which are compiled to executable modules 335, 340, and 345. In this way, each module in the sequence of executable modules can verify the integrity of any one the other executable modules in the sequence, including itself.

In some embodiments, the ephemeral key pair may be unique to the plurality of sequentially ordered executable modules. For example, the ephemeral key pair may be generated just one time, for example at build time (when the source code is compiled into executable modules) or may be generated based on a system time or other random element.

In other embodiments, generating the verification code may include inserting the public component into one or more of the source code files. For example, verification code may be configured to, upon generating the ephemeral key pair, embed the public key component into a source code file. Embedding the public key into the source code file may occur before source code is compiled into an executable module or it may occur as the source code is compiled into an executable module.

In some embodiments, generating verification code may include generating a new executable module configured to verify the integrity of at least one of the plurality of neighboring executable modules. For example, verification code may be configured to generate an executable module that contains an integrity value for one or more of the other modules in the sequence of ordered executable modules. The integrity value may be based on, for example, a computed hash value for one of the one or more of the other modules in the sequence of ordered executable modules. Generating verification code may include generating a number of new executable modules configured to verify the integrity of at least one adjacent executable module. Alternatively, generating verification code may include generating integrity values and ephemeral key pairs for injection into the sequentially ordered executable modules from the plurality of elements of source code as depicted in FIG. 3 and FIG. 4.

At step 540, process 500 may include injecting the verification code into one or more of the source code files. For example, verification code based on a cryptographic hash value of one of the executable modules may be injected into a source code file as described in FIG. 3. In yet other embodiments, the verification code may be injected into an element of source code before it is compiled into an executable module, or simultaneous with the compilation a described in FIG. 4. For example, the public key component of the ephemeral key component may be inserted into an element of source code before it is compiled into an executable module or as part of the compiling.

In some embodiments, the verification code is injected during the compilation process, in which case the compiler may choose to either inject the necessary verification code via the source code, machine code, or using any other internal representation of the code that the compiler obtains as part of the compilation and linking process.

In other embodiments, the verification code injection process may be performed after compilation, whereby the generated injected code is a machine code that may then be embedded into the original executable module which the compiler had outputted, to obtain a new executable module which includes the necessary verification code. The original module may then be discarded to avoid an accidental usage of a module that does not contain the necessary verification code.

In some embodiments, injecting the verification code may include injecting one or more of the source code files with the verification code for each of the executable modules in the sequence. For example, an integrity value may be determined for each of the plurality of sequentially ordered executable modules. In this embodiment, injecting the verification code may include injecting each source code file with the integrity value of each of the preceding modules in the sequence of executable modules. In this way, each successive executable module can be configured to verify the executable module preceding it in the sequence by verifying the integrity value of the preceding module. In other embodiments, an integrity value may be determined for at least one of the plurality of sequentially ordered executable modules. In this embodiment, injecting the verification code may include injecting source code files with the integrity value of at least one of the preceding modules in the sequence of executable modules.

In other embodiments, the verification code may be configured to verify the integrity of a predetermined quantity of the executable modules. In verifying a program with a large quantity of executable modules, computer performance may suffer through verification of each of the executable modules in the sequence due to the demands on computer processing power for verifying such a large quantity of computer code elements. The system may instead verify a predetermined subset of the executable modules. For example, verification code may be configured to verify every other executable module in the sequence, every five modules, every ten modules, ten percent of modules, a first and last module, or any other pre-determined quantity of executable modules in the sequence. Verification of a pre-determined quantity of executable modules may be performed with the integrity value verification technique disclosed in FIG. 3. or with the ephemeral key pair verification technique disclosed in FIG. 4. In yet other embodiments, the verification code verifies a combination of subsections from the plurality of executable modules. For example, the verification code may verify a subsection of an executable module, a combination of subsections from a single or several modules, where the subsection itself may be any portion of an executable module, including its entirety.

In some embodiments, the injecting in step 540 includes inserting the public component of the ephemeral key pair into the source code files and injecting verification code into the source code that verifies the digital signature of one or more of the executable modules via the public component. These embodiments may further include, for example, signing the executable module as described in FIG. 4. In other embodiments, the operations further comprise discarding the private component, for example, after the source code is compiled and the executable module is signed. Discarding the private key helps protect against signature forging attacks because the private key can no longer be compromised, stolen, or forged.

Figure 6:
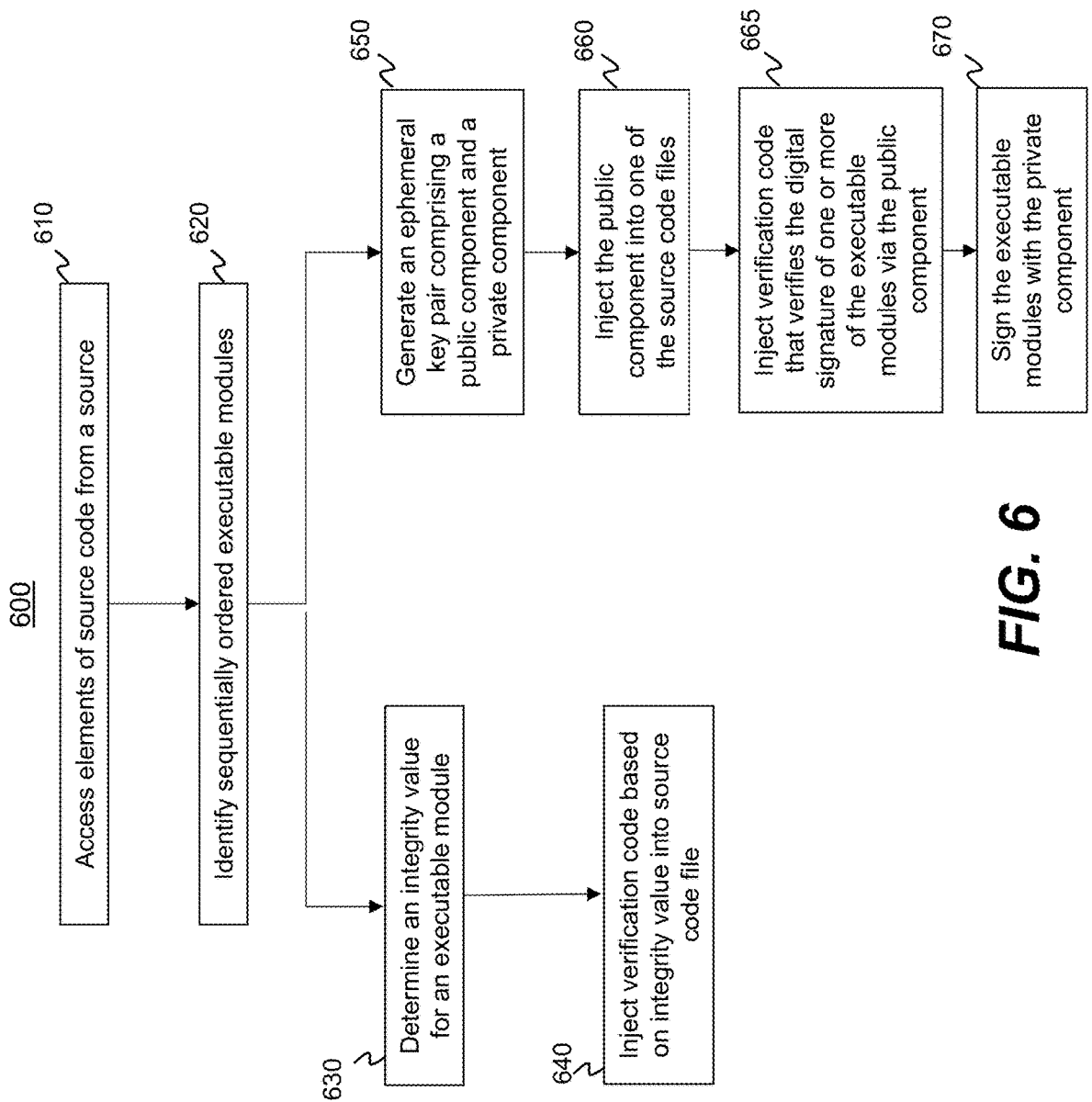
FIG. 6 is a flowchart depicting an exemplary process for injecting verification code into source code files that incorporates an integrity value verification component and an ephemeral key pair component.

FIG. 6 is a block diagram depicting an exemplary process 600 for generating and injecting verification code at build time. Process 600 may be performed, for example, by verification code injector 120. Process 600 may be performed independently of process 500 or it may be performed concurrently or in coordination with process 500.

At step 610, process 600 may include accessing a plurality of elements of source code. At step 620, process 600 may include identifying a plurality of sequentially ordered executable modules which are derived or compiled from the plurality of elements of source code. Steps 610 and 620 may correspond to steps 510 and 520 of process 500, respectively, as discussed above.

Process 600 may include performing both the integrity value verification technique depicted in FIG. 3 and the ephemeral key pair verification technique depicted in FIG. 4 for the plurality of elements of source code. For example, at step 630, process 600 may include determining an integrity value for one or more executable modules. At step 640, process 600 may include injecting verification code into the source code files. Steps 630 and steps 640 may be performed in accordance with the techniques described in connection with FIG. 3 herein.

At step 650, process 600 may include generating an ephemeral key pair comprising a public component and a private component. At step 660, process 600 may include inserting the public component into one or more of the plurality of source code files. At step 665, process 600 may include injecting verification code into the source code that verifies the digital signature one or more executable modules via the public component. At step 670, process 600 may include signing the one or more of the executable modules with the private component. Steps 650, 660, 665, and 670 may be performed in accordance with the techniques described in connection with FIG. 4 herein.

As illustrated in FIG. 6, generating the verification code may include determining an integrity value based on a cryptographic hash value for one of the executable modules and generating an ephemeral key pair. In other embodiments, injecting the verification code may include injecting verification code based on an integrity value into a source code file, inserting the public component into one of the source code files, injecting verification code into the source code that verifies the digital signature of one or more of the executable modules via the public component, and signing the executable modules with the private component of the ephemeral key pair. This combined approach incorporating both the integrity value verification technique depicted in FIG. 3 and the ephemeral key pair verification technique depicted in FIG. 4 can improve data security by creating redundancy in verification techniques and provide more comprehensive security.

In some embodiments, the source of elements of source code contains an integrity violation response module configured to perform a security action based on the verification code. For example, injection of the verification code may cause one of the plurality of executable modules to detect that an executable module has become compromised through a malicious hacker tampering with the module. The integrity response module may perform a security action in response to the detection. Security actions may include, for example, notifying an external logging system of the relevant details, shutting down an application or the system, shutting down part of the system associated with the compromised module, generating an alert or prompt, or performing other security actions in response to the detection.

In some embodiments, the generation of the verification code will employ randomization and/or obfuscation techniques, so that the resulting binary representation of the verification code within the executable modules, will be difficult to detect and/or reverse engineer for an attacker. In particular, this will help defend against an attacker that wishes to create a malicious utility which automatically detects and removes the verification code from all executable modules in the system.

It is to be understood that the disclosed embodiments are not necessarily limited in their application to the details of construction and the arrangement of the components and/or methods set forth in the following description and/or illustrated in the drawings and/or the examples. The disclosed embodiments are capable of variations, or of being practiced or carried out in various ways.

The disclosed embodiments may be implemented in a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a software program, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant virtualization platforms, virtualization platform environments, trusted cloud platform resources, cloud-based assets, protocols, communication networks, security tokens and authentication credentials, and code types will be developed, and the scope of these terms is intended to include all such new technologies a priori.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments unless the embodiment is inoperative without those elements.

Although the invention has been described in conjunction with specific embodiments thereof, it is evident that many alternatives, modifications, and variations will be apparent to those skilled in the art. Accordingly, it is intended to embrace all such alternatives, modifications and variations that fall within the spirit and broad scope of the appended claims.

What is claimed is:

1. A non-transitory computer readable medium including instructions that, when executed by at least one processor, cause the at least one processor to perform operations for injecting verification code into source code files, comprising:
    accessing a plurality of elements of source code from a source;
    identifying a plurality of sequentially ordered executable modules from the plurality of elements;
    generating verification code, wherein:
        the verification code is configured to verify the integrity of at least one of a plurality of neighboring executable modules; and
        wherein generating the verification code includes generating an ephemeral key pair comprising a public component and a private component;
    injecting the verification code into one or more of the source code files, wherein injecting the verification code includes inserting the public component into one or more of the source code files; and
    signing the at least one executable module with the private component.

2. The non-transitory computer-readable medium of claim 1, wherein generating the verification code includes determining an integrity value for at least one of the executable modules.

3. The non-transitory computer-readable medium of claim 2,
    wherein:
        the integrity value is based on a cryptographic hash value for at least one of the executable modules in the sequence; and
        injecting the verification code includes injecting one or more of the source code files with the verification code for at least one of the executable modules in the sequence.

4. The non-transitory computer-readable medium of claim 2, wherein the integrity value is determined based on a digital signature.

5. The non-transitory computer-readable medium of claim 2, wherein:
    the integrity value is based on a cryptographic hash value for at least one of the executable modules in the sequence; and
    injecting the verification code includes injecting the verification code for at least one of the preceding modules in the sequence.

6. The non-transitory computer-readable medium of claim 1, wherein the ephemeral key pair is unique to the plurality of sequentially ordered executable modules.

7. The non-transitory computer-readable medium of claim 1, wherein the operations further comprise discarding the private component.

8. The non-transitory computer-readable medium of claim 1, wherein the verification code verifies a subset of the executable modules.

9. The non-transitory computer-readable medium of claim 1, wherein the source contains an integrity violation response code configured to perform a security action based on the verification code.

10. The non-transitory computer-readable medium of claim 1, wherein the sequence is determined by an order of operations for building the executable modules.

11. The non-transitory computer readable medium of claim 1, wherein the verification code is configured to verify the integrity of a predetermined quantity of the executable modules.

12. A computer-implemented method for injecting verification code into source code files, comprising:
    accessing a plurality of elements of source code from a source;
    identifying a plurality of sequentially ordered executable modules from the plurality of elements;
    generating verification code, wherein:
        the verification code is configured to verify the integrity of at least one of a plurality of neighboring executable modules; and
        wherein generating the verification code includes generating an ephemeral key pair comprising a public component and a private component;
    injecting the verification code into one or more of the source code files, wherein injecting the verification code includes inserting the public component into one or more of the source code files; and signing the at least one executable module with the private component.

13. The computer-implemented method of claim 12, wherein the generating of the verification code further comprises:

determining an integrity value for at least one of the executable modules.

14. The computer-implemented method of claim 13, wherein the source contains integrity violation response code configured to perform a security action based on the verification code.

15. The computer-implemented method of claim 13, further comprising:

detecting an integrity violation based on the verification code; and performing a security action.

16. The computer-implemented method of claim 13, wherein generating verification code includes generating a new executable module configured to verify the integrity of at least one of the plurality of neighboring executable modules.

17. The computer-implemented method of claim 13, wherein the integrity value of the at least one executable module includes a cryptographic hash value for one of the preceding executable modules in the sequence.

18. The computer-implemented method of claim 12, wherein generating verification code is repeated for each of the sequentially ordered executable modules.

19. The computer-implemented method of claim 12, wherein:

the ephemeral key pair is generated at a build time, and the ephemeral key pair is unique to the build time.

20. The computer-implemented method of claim 12, wherein inserting the public component into one or more of the source code files occurs as the source code is compiled into an executable module.

\* \* \* \* \*